United States Patent
Falcon et al.

(10) Patent No.: US 11,167,737 B2
(45) Date of Patent: Nov. 9, 2021

(54) METHOD AND APPARATUS FOR ASSISTED DECELERATION BASED TRAILER BRAKING

(71) Applicant: GM GLOBAL TECHNOLOGY OPERATIONS LLC, Detroit, MI (US)

(72) Inventors: Paul Falcon, Royal Oak, MI (US); Douglas J. Spry, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 280 days.

(21) Appl. No.: 16/382,806

(22) Filed: Apr. 12, 2019

(65) Prior Publication Data
US 2020/0324745 A1    Oct. 15, 2020

(51) Int. Cl.
*B60T 8/172*    (2006.01)
*B60T 8/171*    (2006.01)
*B60T 8/17*     (2006.01)

(52) U.S. Cl.
CPC .............. *B60T 8/172* (2013.01); *B60T 8/171* (2013.01); *B60T 8/1701* (2013.01); *B60T 2250/04* (2013.01); *B60Y 2200/147* (2013.01); *B60Y 2300/28* (2013.01)

(58) Field of Classification Search
CPC ........ B60T 8/172; B60T 8/171; B60T 8/1701; B60T 2250/04; B60Y 2200/147; B60Y 2300/28
See application file for complete search history.

(56) References Cited

U.S. PATENT DOCUMENTS

| | | | | |
|---|---|---|---|---|
| 3,964,796 A | * | 6/1976 | Bremer | B60T 8/1708 303/178 |
| 2014/0046566 A1 | * | 2/2014 | Maitlen | B60T 8/172 701/70 |
| 2015/0232075 A1 | * | 8/2015 | Fosdike | B60T 8/171 701/70 |
| 2016/0185216 A1 | * | 6/2016 | Clarke | B60K 17/35 74/665 F |
| 2016/0318421 A1 | * | 11/2016 | Healy | B60L 58/10 |
| 2016/0332633 A1 | * | 11/2016 | Raffone | G01G 19/086 |
| 2017/0267220 A1 | * | 9/2017 | Serra | B60T 8/17636 |
| 2018/0186381 A1 | * | 7/2018 | Erlien | B60W 10/20 |
| 2018/0215358 A1 | * | 8/2018 | Hall | B60T 7/20 |
| 2018/0334152 A1 | * | 11/2018 | Hunt | B60T 8/171 |
| 2019/0322273 A1 | * | 10/2019 | Wu | B60W 50/14 |
| 2020/0406883 A1 | * | 12/2020 | Umetsu | B60W 10/196 |

\* cited by examiner

*Primary Examiner* — Hunter B Lonsberry
*Assistant Examiner* — Elizabeth Yang
(74) *Attorney, Agent, or Firm* — Lorenz & Kopf LLP

(57) ABSTRACT

Methods and apparatus are provided for assisted deceleration based trailer braking. The apparatus includes a trailer brake controller for applying a trailer brake in response to a brake control signal, a wheel speed sensor, an accelerometer for determining an acceleration, and a trailer controller for generating the brake control signal in response to a change in the acceleration indicating a negative value, the trailer controller further operative to couple the brake control signal to the trailer brake controller.

15 Claims, 5 Drawing Sheets

METHOD AND APPARATUS FOR ASSISTED DECELERATION BASED TRAILER BRAKING

INTRODUCTION

The present disclosure relates generally to a system of assisted braking for use in a trailering application with a motor vehicle. More specifically, aspects of the present disclosure relate to systems, methods and devices for using trailer velocity, acceleration, and grade data to provide assisted change in deceleration based braking on a trailer in response to the absence of a brake request from the tow vehicle.

Pulling a trailer with a tow vehicle has always been and remains a complicated endeavor for many drivers. The ball hitch is typically employed as a trailer connection and provides a joint between the tow vehicle and the trailer. The trailer typically will also have an electrical connection to supply electricity to the lights and the trailer brakes. Problems arise if the electrical connection becomes disconnected or is broken. The brake power or braking signal from the towing vehicle to the trailer will fail to transmit resulting in no application of the trailer brakes during stopping. As a result, stopping a vehicle and trailer without operable trailer brakes my result in a greatly lengthened stopping distance and increased difficulty to control the trailer to stay in a straight line. Current surge brake systems have a hydraulic system that allows relative motion between the truck and trailer. The hydraulic system uses that relative motion to create hydraulic pressure which creates pressure in the brake system. It would be desirable to provide a more robust braking mechanism that would be operative even if the electrical connection to the trailer is broken.

The above information disclosed in this background section is only for enhancement of understanding of the background of the invention and therefore it may contain information that does not form the prior art that is already known in this country to a person of ordinary skill in the art.

SUMMARY

Disclosed herein are vehicle braking methods and systems and related control logic for provisioning vehicle systems, methods for making and methods for operating such systems, and motor vehicles equipped with onboard control systems. By way of example, and not limitation, there is presented various embodiments of an automatic deceleration based braking system for trailering in a motor vehicle, and a method for performing automatic deceleration based braking for trailering in a motor vehicle are disclosed herein.

In accordance with an aspect of the present invention a trailer braking system having an inertial measurement unit for measuring an acceleration, a brake controller for applying a trailer brake in response to a brake control signal, and a processor for determining a braking force in response to the acceleration having a negative value and for generating the brake control signal in response to the braking force.

In accordance with another aspect of the present invention a wheel speed indicator for measuring a wheel speed and wherein the braking force is further determined in response to the wheel speed.

In accordance with another aspect of the present invention a memory for storing a calibrated table and wherein the processor is operative to determine the braking force in response to the calibrated table.

In accordance with another aspect of the present invention wherein the processor is operative to determine the braking force in response to an algorithm.

In accordance with another aspect of the present invention an interface to detecting a tow vehicle brake signal and wherein the tow vehicle brake signal is coupled to the brake controller in place of the brake control signal.

In accordance with another aspect of the present invention a brake light and wherein the brake light is illuminated in response to the brake control signal.

In accordance with another aspect of the present invention a wheel speed indicator for measuring a wheel speed and wherein the braking force is zero in response to the wheel speed being below a minimum wheel speed.

In accordance with another aspect of the present invention a trailer braking method for determining an acceleration, determining a wheel speed, calculating a braking force in response to the acceleration and the wheel speed, and applying a trailer brake in response to the braking force.

In accordance with another aspect of the present invention wherein the trailer brake is applied in response to the wheel speed exceeding a minimum value and the acceleration having a negative value.

In accordance with another aspect of the present invention wherein the braking force is calculated in response to a calibrated table.

In accordance with another aspect of the present invention wherein the braking force is calculated in response to an algorithm.

In accordance with another aspect of the present invention detecting a tow vehicle braking signal wherein the trailer brake is controlled in response to the tow vehicle braking signal.

In accordance with another aspect of the present invention generating a brake light control signal in response to the braking force having a positive value.

In accordance with another aspect of the present invention wherein the braking force is zero in response to the wheel speed being below a minimum wheel speed.

In accordance with another aspect of the present invention an apparatus having a trailer brake controller for applying a trailer brake in response to a brake control signal, an accelerometer for determining an acceleration, and a trailer controller for generating the brake control signal in response to the acceleration indicating a negative value, the trailer controller further operative to couple the brake control signal to the trailer brake controller.

In accordance with another aspect of the present invention wherein the trailer controller is further operative to generate a brake release signal in response to the acceleration having a positive value and wherein the trailer brake controller is operative to release the trailer brake in response to the brake release signal.

In accordance with another aspect of the present invention wherein the trailer controller is further operative to determine a brake force in response to the acceleration and wherein the brake control signal is indicative of the brake force.

In accordance with another aspect of the present invention a wheel speed indicator for measuring a wheel speed and wherein the brake control signal is generated in response to the wheel speed.

In accordance with another aspect of the present invention a brake light controller for illuminating a brake light in response to the brake control signal.

In accordance with another aspect of the present invention a wheel speed indicator for measuring a wheel speed and wherein a brake release signal is generated in response to the wheel speed being below a threshold value.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
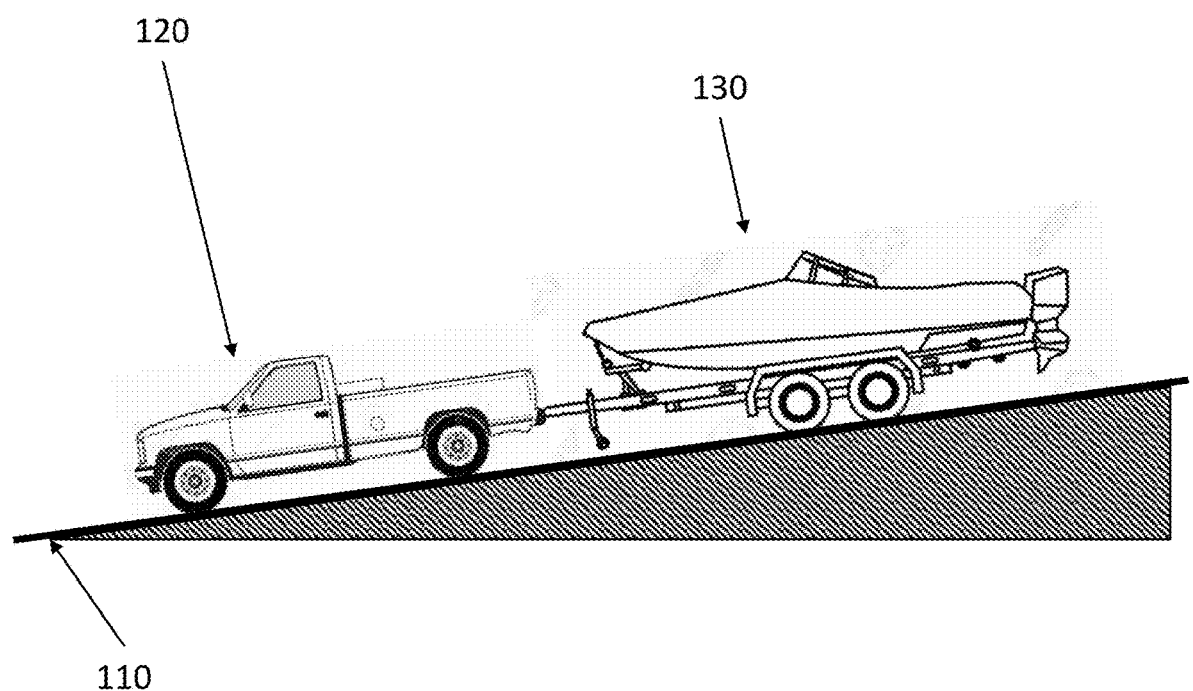
FIG. 1 shows an application for the method and apparatus for assisted deceleration based trailer braking according to an exemplary embodiment of the present disclosure.

Turning now to FIG. 1, an application for the method and apparatus assisted deceleration based trailer braking 100 according to an exemplary embodiment of the present disclosure is shown. The exemplary application shows a towing vehicle 120 and a loaded trailer 130 having a trailer brake system according to the present disclosure. The towing vehicle 120 and the trailer 130 are traveling along a road surface having a downward incline. Using a traditional electrical trailer brake system, if the trailer electrical connector became disconnected from the towing vehicle 120, the trailer would not apply the brakes during deceleration in response to braking of the towing vehicle 120. This may result in a dangerous conditions such as extended braking time and loss of trailer 130 and towing vehicle 120 stability.

In this exemplary embodiment, the trailer brake system may use trailer velocity, acceleration, and/or grade data to provide assisted deceleration based braking on a trailer in the event the trailer 130 does not have a brake request from the towing vehicle 120. The trailer brake system may utilize the change in grade adjusted acceleration to determine when to apply the brakes and how much brake force to apply. In addition, wheel speed sensor data and an inertial measurement unit (IMU) accelerometer data from a trailer may be used to determine grade adjusted acceleration.

In another exemplary embodiment, if the trailer 130 is not receiving a brake signal from the towing vehicle 120 and the change in grade adjusted acceleration is negative, the system may assume that the towing vehicle 120 is trying to slow down but the brake request is not getting to the trailer 130 for whatever reason. At this point, the system may trigger the brakes on the trailer 130.

Figure 2:
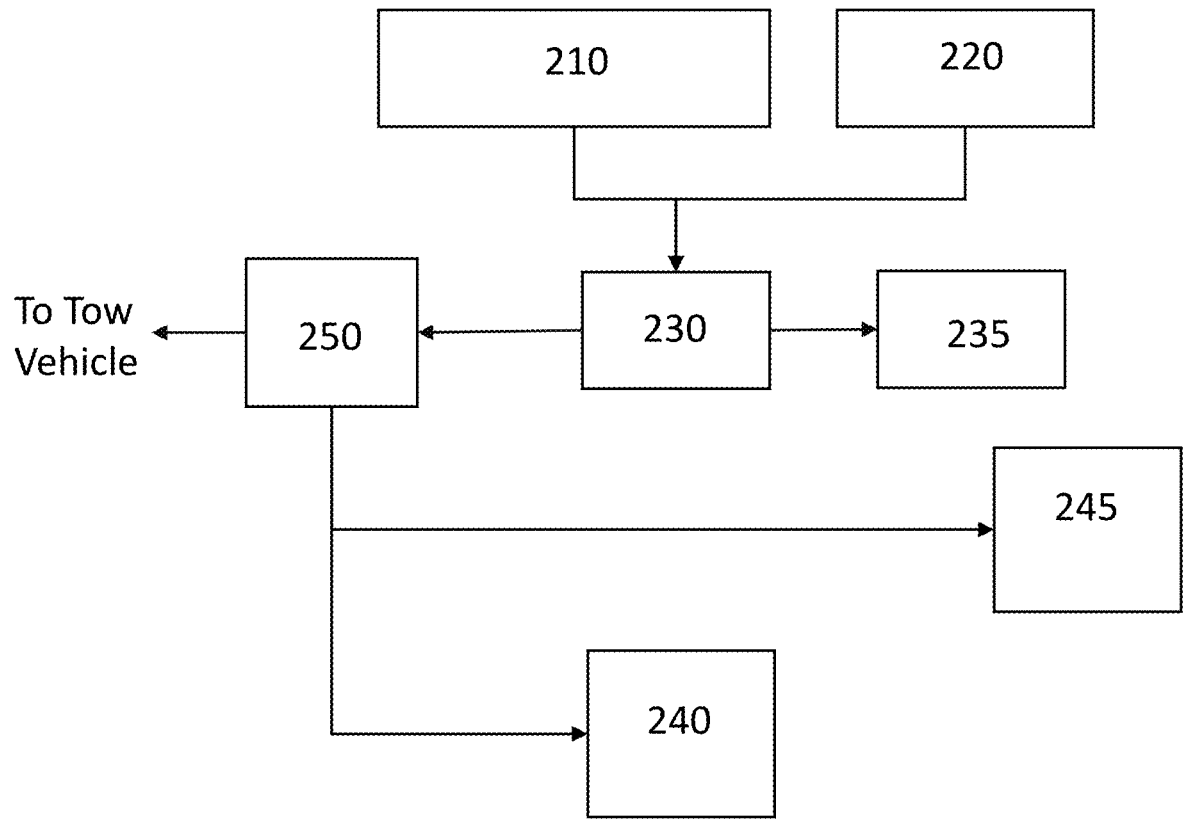
FIG. 2 shows a block diagram illustrating a system for assisted deceleration based trailer braking to an exemplary embodiment of the present disclosure.

Turning now to FIG. 2, a block diagram of a system for assisted deceleration based trailer braking 200 according to an exemplary embodiment of the present disclosure is shown. The exemplary system 200 includes a wheel speed sensor 210, an accelerometer 220, a trailer interface 250, a processor 230, a trailer brake controller 245, and a trailer light system 240.

In an exemplary embodiment, the trailer interface 250 is operative to control trailer systems such as lights and braking in response to instructions or signals from the tow vehicle. For example, the trailer interface 250 may receive a signal from the tow vehicle that the tow vehicle brakes have been applied. The trailer interface 250 is then operative to generate a brake control signal to couple to the brake controller 245 to instruct the brake controller 245 to apply the trailer brakes at a certain brake force corresponding to the braking level of the towing vehicle. The trailer interface 250 is further operative to apply a brake light control signal to the trailer lights 240 in order to illuminate the trailer brake lights. The trailer interface 250 may further be operative to generate a running light control signal and turning signal control signal to couple to the trailer lights 240 in response to indications from the tow vehicle.

In this exemplary embodiment, the processor 230 is operative to monitor the output of the wheel speed sensor 210 and the accelerometer 220. The processor 230 may determine from the wheel speed sensor 210 data and the accelerometer 220 data that there is a change such that the grade adjusted acceleration is negative. The processor 230 may then generate a warning signal to couple to the trailer interface 250 indicative of a potential braking situation may be occurring. The trailer interface 250 may then generate a brake control signal to couple to the brake controller 245 in response to the indication from the processor 230. The processor may then monitor the wheel speed sensor 210 data and the accelerometer 220 data to determine when the grade adjusted acceleration reaches zero. Until that point, the processor 230 may continue to provide the warning signal to the trailer interface 250. Once the processor 230 determines that there is a change in the grade adjusted acceleration to a positive value, the processor may then cease the warning signal and/or provide a release brake indication to the trailer interface 250. The brake force may be determined by the processor 230 in response to the grade adjusted acceleration and provided to the trailer interface 250 such that the trailer interface may apply the appropriate braking force to the brake controller 245. The processor 230 may determine the brake force in response to a calibrated table on a memory 235 with trailer velocity and change in grade adjusted acceleration. Alternatively an algorithm may be used by the processor 230 to determine the brake force in response to a calibrated table with trailer velocity and/or change in grade adjusted acceleration. The braking force may be set to zero in response to the wheel speed being below a minimum wheel speed value. This may avoid the brakes being applied at low trailer speeds, such as five kilometers per hour. Once the release brake indication is provided by the processor 230 to the trailer interface 250, the processor continues to monitor the trailer wheel speed IMU data, trailer velocity and grade adjusted acceleration.

In an alternative embodiment, the processor may be operative to calculate the grade adjusted acceleration and to provide this value to the trailer interface. The trailer interface 250 may be operative to monitor the grade adjusted acceleration value if it is not receiving a brake signal from the towing vehicle. If the trailer interface 250 determines that the change in grade adjusted acceleration is negative, the system may assume that the tow vehicle is trying to slow down but the brake request is not getting to the trailer interface 250. The trailer interface 250 may then generate a brake control signal to couple to the brake controller 245 to trigger the brakes on the trailer until the deceleration slows where the algorithm can ease out of the brake apply and allow the tow vehicle to accelerate again.

Figure 3:
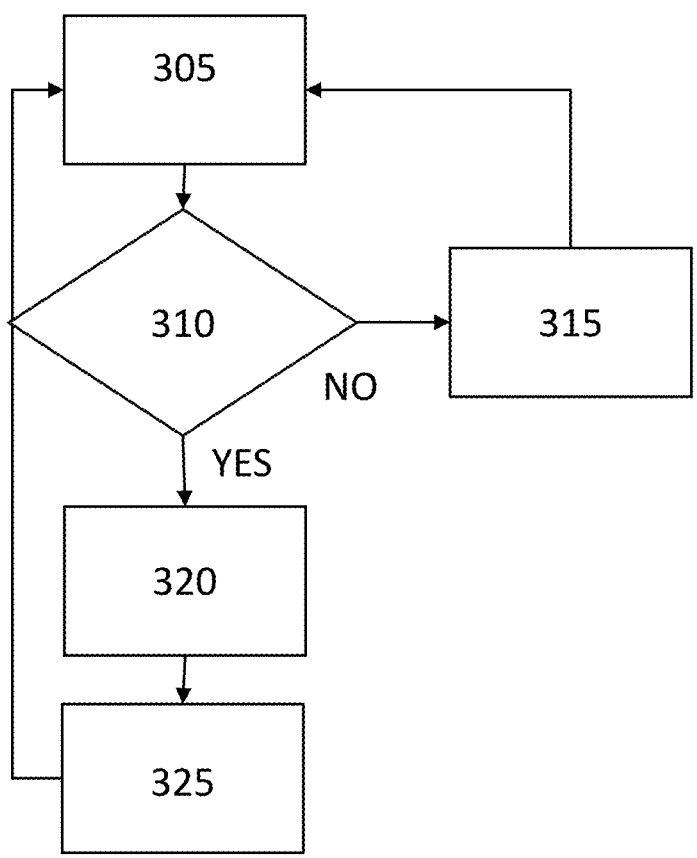
FIG. 3 shows a flow chart illustrating a method for assisted deceleration based trailer braking according to an exemplary embodiment of the present disclosure.

Turning now to FIG. 3, a flow chart illustrating an exemplary method for assisted deceleration based trailer braking 300 according to an exemplary embodiment of the present disclosure is shown. In this exemplary embodiment the method is first operative to determine the grade adjusted acceleration value 305 in response to at least one trailer sensor. This trailer sensor may include an IMU, a GPS detector, a wheel speed sensor, or the like. The grade adjusted acceleration value may be determined in response to an algorithm or may be determined by comparing the trailer sensor data to a lookup table or the like. Adjusted grade acceleration is the change in velocity of the trailer with respect to time adjusted for the forward or rearward pitch or slope of the road surface. The method is then operative to compare the grade adjusted acceleration value to a previous grade adjusted acceleration value 310 to determine a delta grade adjusted acceleration. The grade adjusted acceleration value may be measured periodically, such as every 100 milliseconds and stored in a memory. The delta grade adjusted acceleration determined in response to two or more of the stored values. If the change in grade adjusted acceleration is positive, indicative of increasing acceleration, then brakes will be release if active 315. The method is then operative to return to determine the grade adjusted acceleration value 305.

If the change in grade adjusted acceleration is negative, indicating increasing deceleration, the method is then operative to determine the braking force 320 in response to the change in grade adjusted acceleration and the trailer velocity. For example, if the change in grade adjusted acceleration is zero wherein the acceleration is constant, then the current brake force will be maintained. If the change in grade acceleration is a negative value, indicating that the tow vehicle is decelerating, the brakes may be applied. If the change in grade acceleration is a positive value, indicating that the tow vehicle is accelerating, the brake application may be released.

The method is then operative to apply the brakes 325 on the trailer in response to the determined braking force. In an exemplary embodiment, if a brake request from the tow vehicle or trailer interface is present, that brake request takes priority. If no brake requested is present from the tow vehicle or trailer interface, the determined brake force is used. The thresholds and different transitions points between applying and releasing the brakes may be calibrated in response to the particular trailer attributes, such as weight, size, number of axels, etc.

Figure 4:
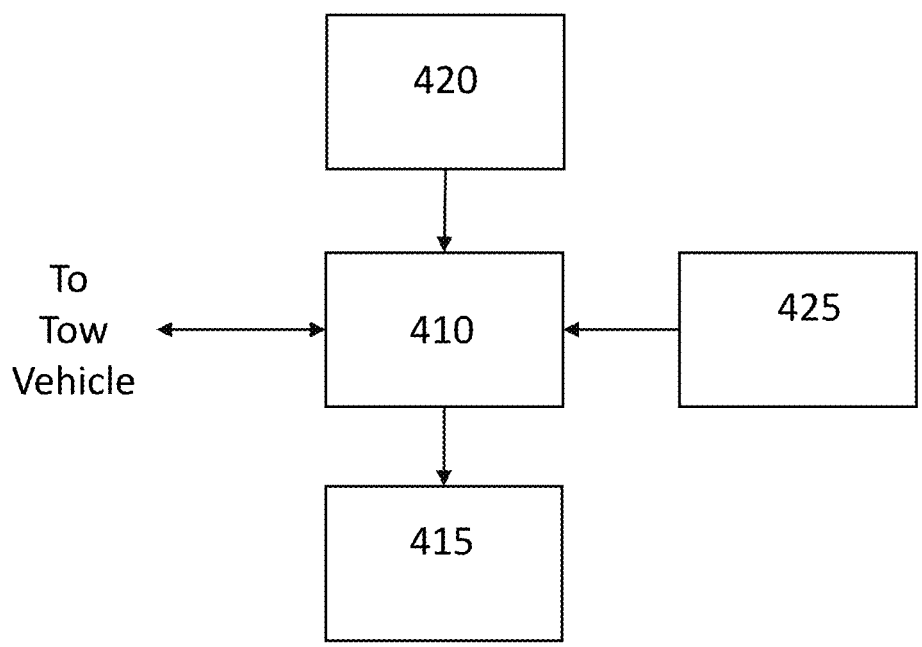
FIG. 4 shows block diagram illustrating a system for assisted deceleration based trailer braking according to another exemplary embodiment of the present disclosure.

Turning now to FIG. 4, a block diagram of a system for assisted deceleration based trailer braking 400 according to an exemplary embodiment of the present disclosure is shown. The system 400 may include a controller 410, a brake controller 415 and an accelerometer 420. In this exemplary embodiment, the controller 410 is part of a trailer electrical system. The controller 410 is operative to receive various control signals from a tow vehicle. These control signals may include braking control signals, including brake force, as well as light control signals such as running lights, brake lights, reverse lights, etc. Under normal operating conditions, the controller 410 would receive a braking control signal from the tow vehicle and would generate a trailer braking control signal to couple to the brake controller 415. This trailer braking control signal would be indicative of a brake force, or a magnitude of braking force to be applied to the brakes by the braking controller 415.

In an exemplary embodiment according to the present disclosure, the controller 410 is operative to generate the trailer braking control signal in the absence of a braking control signal from the tow vehicle. The braking control signal may not be received from the tow vehicle if the electrical connection has been severed between the trailer and the tow vehicle. In addition to monitoring the signals from the tow vehicle, the controller 410 is operative to monitor an output of the accelerometer 420. The accelerometer 420 is operative to detect longitudinal, or front and rear, acceleration of the trailer. This acceleration may be presented as a positive acceleration for an accelerating vehicle or a negative value for a decelerating vehicle.

In the instance of the controller 410 monitoring the output of the accelerometer 420 wherein the accelerometer is indicative of a negative change in acceleration, the controller 410 may generate a trailer brake control signal in the absence of a brake control signal from the tow vehicle. This trailer brake control signal may indicate a brake force to be applied to the trailer brakes in response to the brake controller 415 wherein the brake force is inversely proportional to the change in acceleration. Thus, the more negative the change in acceleration, the greater the brake force. The brake controller 415 may optionally illuminate a brake light in response to the brake control signal. The brake force may be determined by the controller in response to a calibrated table stored on a memory or in response to an algorithm for calculating the brake force.

In an exemplary embodiment, if the accelerometer 420 is indicative of a negative acceleration and a braking control signal is received from the tow vehicle indicative of a braking force, the braking force from the tow vehicle will be used in lieu of a braking force determined by the controller 410.

The controller 410 may be further operative to generate a brake release signal in response to the change in acceleration having a positive value and wherein the brake controller 415 is operative to release the trailer brake in response to the brake release signal. The controller 410 may determine a brake force in response to the change in acceleration and wherein the brake control signal is indicative of the brake force. The system 400 may also include a wheel speed sensor 425 for measuring a wheel speed and wherein the brake control signal is generated in response to the wheel speed. The wheel speed sensor 425 may be indicative of a wheel speed being below a threshold value, such as five km/h, a brake release signal may generated. For example, if the wheel speed sensor 425 for measuring a wheel speed is indicative of a wheel speed of less than 5 km/h, the braking force is set to zero.

Figure 5:
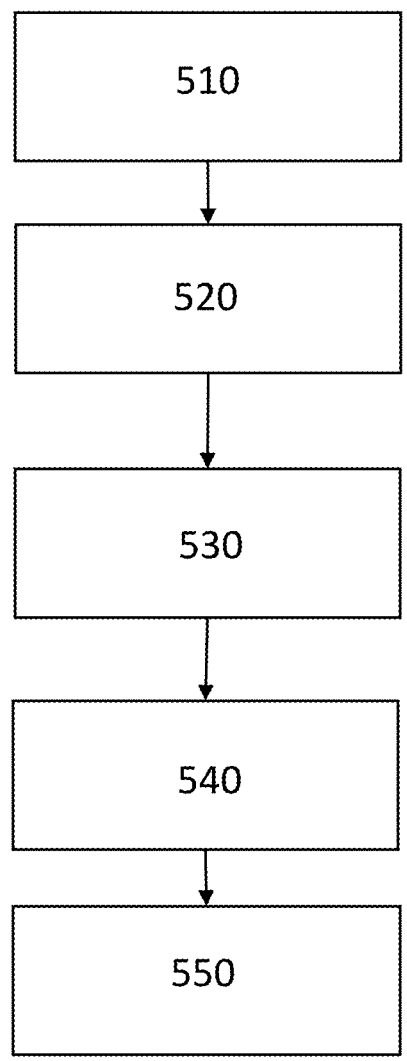
FIG. 5 shows a flow chart illustrating a method for assisted deceleration based trailer braking according to another exemplary embodiment of the present disclosure.

Turning now to FIG. 5, a flow chart illustrating another method for assisted deceleration based trailer braking 500 according to an exemplary embodiment of the present disclosure is shown. In the exemplary trailer braking method the method is first operative to determining an acceleration 510. The acceleration may be determined in response to an IMU measurement signal, an accelerometer signal, a wheel speed indicator signal, or a global positioning signal or the like. The method may further be operative to determine a wheel speed from the wheel speed indicator 520. The method then calculates a braking force in response to the change in acceleration and the wheel speed 530. In particular, the method may calculate the braking force in response to a negative acceleration indicative of a deceleration of the trailer. The method is then operative to apply a trailer brake in response to the braking force 540. The trailer brake may applied in response to the wheel speed exceeding a minimum value and the change in acceleration having a negative value. The braking force may be calculated in response to a calibrated table or in response to an algorithm. The method may further be operative to generate a brake light control signal in response to the braking force having a positive value 550. The braking force may be determined to be zero in response to the wheel speed being below a minimum wheel speed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A trailer braking system comprising:
   an inertial measurement unit, in a trailer, for measuring an acceleration;
   a brake controller, in the trailer, for applying a trailer brake in response to a brake control signal;
   a wheel speed indicator, in the trailer, for measuring a wheel speed; and
   a processor, in the trailer, for determining a road grade in response to the acceleration, calculating a grade adjusted acceleration value in response to the road grade and the acceleration, and a braking force in response to the wheel speed and a change in the grade adjusted acceleration having a negative value and for generating the brake control signal in response to the braking force and wherein the braking force is zero in response to the wheel speed being below a minimum wheel speed and the grade adjusted acceleration having the negative value.

2. The trailer braking system of claim 1 further comprising a memory for storing a calibrated table and wherein the processor is operative to determine the braking force in response to a comparison of the grade adjusted acceleration value and the calibrated table.

3. The trailer braking system of claim 1 wherein the processor is operative to determine the braking force in response to an algorithm, the grade adjusted acceleration value and the wheel speed.

4. The trailer braking system of claim 1 further comprising an interface to detecting a tow vehicle brake signal and wherein the tow vehicle brake signal is coupled to the brake controller in place of the brake control signal.

5. The trailer braking system of claim 1 further comprising a brake light and wherein the brake light is illuminated in response to the brake control signal.

6. A trailer braking method comprising:
   determining an acceleration by an inertial measurement unit in a trailer;
   determining, by a processor in the trailer, a road grade in response to the acceleration;
   calculating, by the processor in the trailer, a grade adjusted acceleration value in response to the road grade and the acceleration,
   determining a wheel speed by a wheel speed indicator in the trailer;
   calculating, by the processor, a braking force in response to a change in the grade adjusted acceleration having a negative value and the wheel speed; and
   applying a trailer brake in response to the braking force wherein the braking force is zero in response to the wheel speed being below a minimum wheel speed and the grade adjusted acceleration having the negative value.

7. The method of claim 6 wherein the trailer brake is applied in response to the wheel speed exceeding a minimum value and the change in the grade adjusted acceleration having the negative value.

8. The method of claim 6 wherein the braking force is calculated in response to a calibrated table.

9. The method of claim 6 wherein the braking force is calculated in response to an algorithm, the grade adjusted acceleration value and the wheel speed.

10. The method of claim 6 further comprising detecting a tow vehicle braking signal wherein the trailer brake is controlled in response to the tow vehicle braking signal.

11. The method of claim 6 further comprising generating a brake light control signal in response to the braking force having a positive value.

12. An apparatus comprising;
    a trailer brake controller, within a trailer, configured to apply a trailer brake in response to a brake control signal;
    an accelerometer, within the trailer, operative to determine an acceleration;
    a wheel speed indicator, within the trailer, for measuring a wheel speed; and
    a trailer controller, within the trailer, configured to determine a road grade in response to the acceleration, to calculate a grade adjusted acceleration value in response to the road grade and the acceleration, and to generate the brake control signal in response to the grade adjusted acceleration indicating a negative value, the trailer controller further operative to couple the brake control signal to the trailer brake controller in response to the wheel speed being above a threshold value and a brake release signal in response to the wheel speed being below the threshold value and the grade adjusted acceleration having the negative value.

13. The apparatus of claim 12 wherein the trailer controller is further operative to generate the brake release signal in response to the grade adjusted acceleration having a positive value and wherein the trailer brake controller is operative to release the trailer brake in response to the brake release signal.

14. The apparatus of claim 12 wherein the trailer controller is further operative to determine a brake force in response to the grade adjusted acceleration and wherein the brake control signal is indicative of the brake force.

15. The apparatus of claim 12 further comprising a brake light controller for illuminating a brake light in response to the brake control signal.

* * * * *